TELEVISION GAIN CONTROL SYSTEM

Filed June 11, 1948

2 SHEETS—SHEET 1

INVENTOR.
Kurt Schlesinger
BY
Foorman L. Mueller
Atty.

INVENTOR.
Kurt Schlesinger
BY
Foorman L. Mueller
Atty.

Patented Mar. 17, 1953

2,632,047

UNITED STATES PATENT OFFICE 2,632,047

TELEVISION GAIN CONTROL SYSTEM

Kurt Schlesinger, Maywood, Ill., assignor to Motorola, Inc., Chicago, Ill., a corporation of Illinois Application June 11, 1948, Serial No. 32,511

11 Claims. (Cl. 178—5.8)

Figure 1:
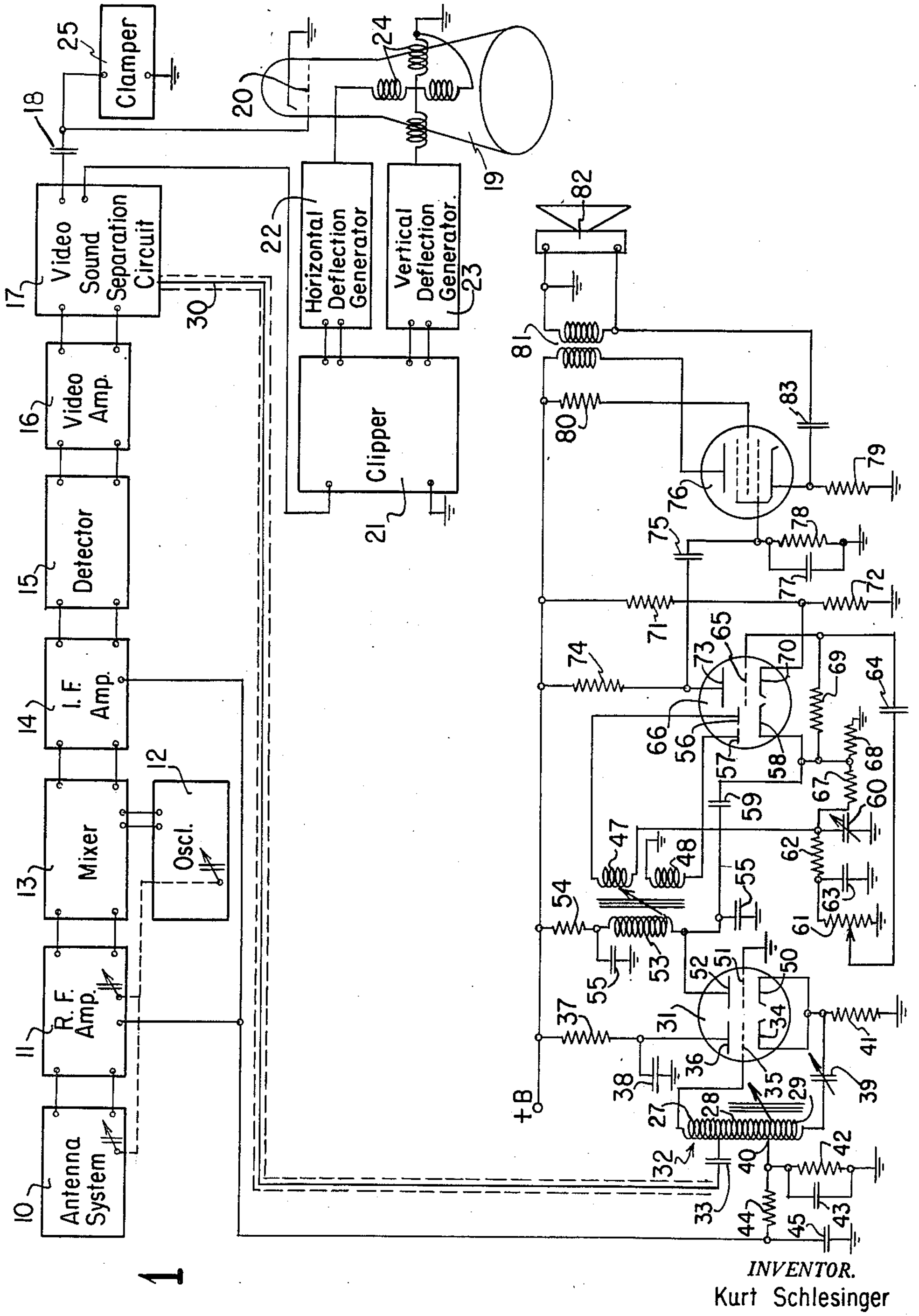

This invention relates generally to television receivers and more particularly to an improved sound system therefor which provides an effective gain control bias.

In the prior art, various systems have been proposed for providing gain control for television receivers. Difficulty has been encountered as the average amplitude of the carrier wave which is modulated by the video signal varies with the picture being received and use of this average amplitude to provide a gain control bias would result in change in bias due to different picture content which is obviously undesirable. Systems have been devised in which amplitude of synchronization signals are used for providing the gain control bias, but such systems have not been entirely satisfactory as they are relatively complicated and are substantially affected by noise.

The intermediate frequency gain control in a television receiver controls the contrast of the reproduced picture provided that black is held at a constant level. It is desirable that such control be automatic with respect to changes in signal strength, but that it be manually adjustable so that the user can have the picture contrast which he desires. In present receivers it has been necessary for satisfactory reproduction to provide a contrast control knob on the front panel of the receiver and a separate brightness control on the rear thereby complicating the controls of the television receiver.

It is, therefore, an object of the present invention to provide an improved control system for a television receiver, which combines contrast control and automatic gain control and eliminates the need of a separate brightness control.

Another object of this invention is to provide contrast control for a television receiver which does not require a separate control knob.

A further object of this invention is to provide a gain control for a television receiver in which the control voltage is provided by the sound system of the receiver.

A still further object is to provide a simplified squelch for the sound system of a television receiver which eliminates noise normally reproduced when tuning from one station to another.

A feature of this invention is the provision of a television receiver in which the amplification of the received waves is controlled by a voltage which varies in accordance with the amplitude of the intercarrier sound signal.

Another feature of this invention is the provision of a contrast control system for a television receiver having continuous tuning or vernier tuning in which the contrast is adjusted by fine tuning of the receiver.

A further feature of this invention is the provision of a television receiver having an intercarrier sound system in which the amplitude of the intercarrier signal is limited so that the sound is substantially independent of the intercarrier amplitude.

A still further feature of this invention is the provision of a frequency modulation discriminator in which a control voltage is produced when a signal is received to render a normally blocked sound system operative.

Figures 2, 3:
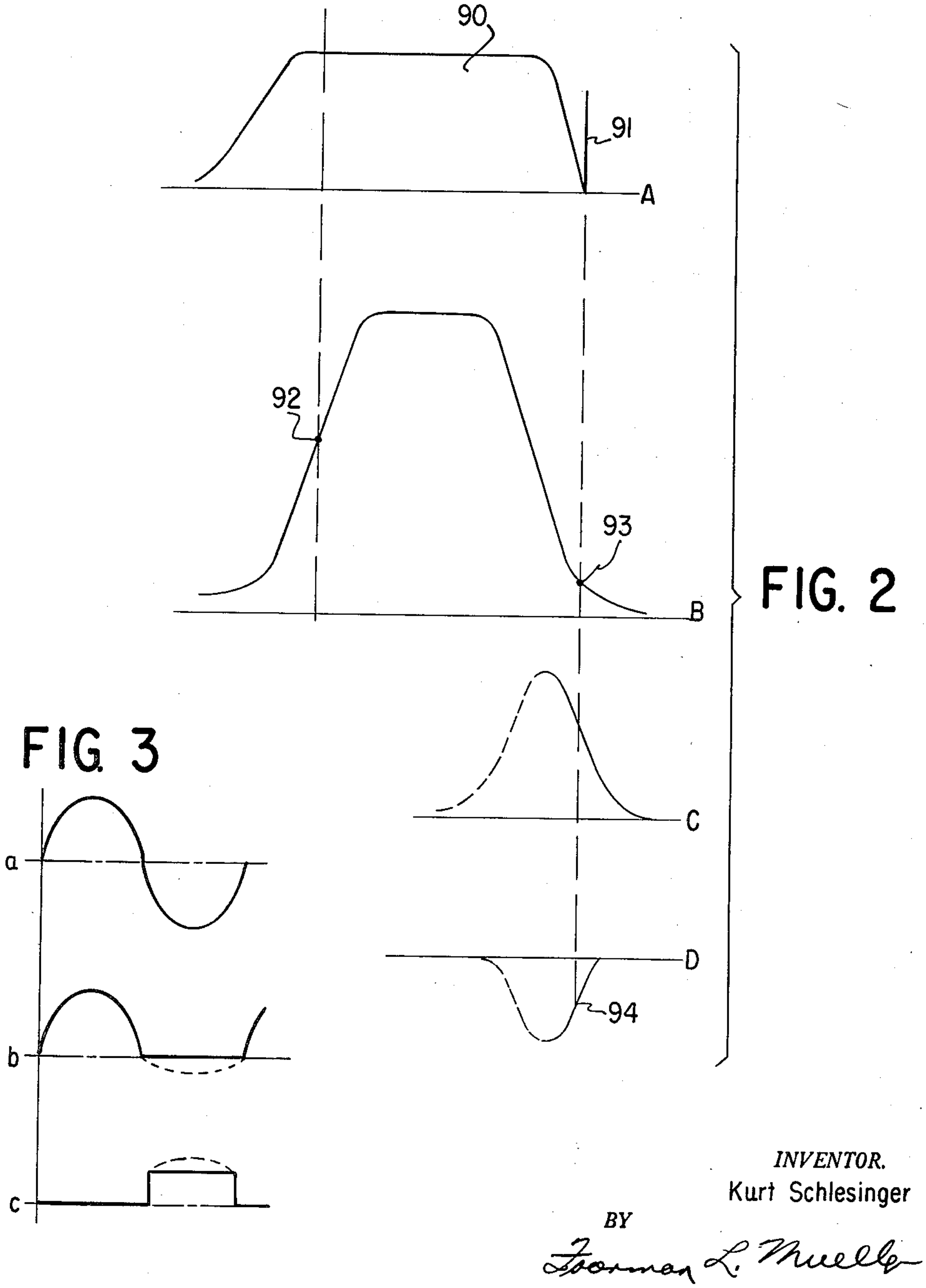

Further objects, features and advantages will be apparent from a consideration of the following description taken in connection with the accompanying drawings in which:

Fig. 1 is a circuit diagram of a television receiver embodying the novel sound controlled automatic gain control system in accordance with the invention; and Fig. 2 is a curve chart illustrating the operation of the gain control provided by the system of Fig. 1.

In practicing the invention there is provided a television receiver of the type utilizing an intercarrier sound system. That is, the picture and sound intermediate frequency signals are amplified in the same intermediate frequency amplifier, and an intercarrier sound signal is derived by heterodyning the picture and sound intermediate frequency signals. This intercarrier signal corresponds to the differences in frequencies between the picture and sound signals and in standard television systems is 4.5 megacycles. In accordance with the invention the intercarrier signal is applied to a clipper which limits the value thereof so that the amplitude of the signal from which the sound is demodulated is constant. The clipper circuit is arranged to provide, as a byproduct, a direct current control voltage which is a measure of the amplitude of the intercarrier signal before clipping and this voltage is applied to the radio frequency and intermediate frequency amplifiers to control the gain thereof. The amplitude of the intercarrier signal depends upon the signal strength, that is, the amplitudes of the picture and sound signals and also upon the band pass characteristics of the intermediate frequencies amplifier. By changing the tuning of the receiver the position of the sound signal with respect to the intermediate frequency band pass can be changed, and as the intermediate frequency characteristic is dropping in this vicinity, the amplitude of the intercarrier signal will be varied. Therefore, by changing the tuning of the receiver the gain can be varied. As the sound signal is obtained after limiting the change of gain of the intercarrier signal will not affect the sound but will affect the video output and is effective to change the contrast of the picture. The clipped sound signal is applied to a discriminator where the frequency modulation is converted to amplitude modulation for reproduction. A squelch circuit is coupled to the discriminator so that the audio system is cut off while tuning between stations and undesirable noise is thereby eliminated.

Referring now to the drawings, in Fig. 1 there is illustrated a television receiver including an antenna system 10, a radio frequency amplifier 11, an oscillator 12, and a mixer 13. The antenna system, radio frequency amplifier and oscillator are all tunable to provide a standard superheterodyne circuit. Both picture and sound intermediate frequencies are produced in the mixer 13 and applied to a common intermediate frequency amplifier 14 wherein signals within a certain frequency range defined by the band pass of the amplifier are amplified. The picture and sound intermediate frequencies are applied to detector 15 wherein the picture signals are derived from the picture intermediate frequency wave and the picture and sound intermediate frequency waves are heterodyned to provide an intercarrier sound wave. The video and intercarrier waves are amplified in the video amplifier 16 and then applied to video-sound separation circuit 17 which separates the video and sound signals applying the video signals through condenser 18 to the control grid 20 of tube 19 and to the clipper 21 wherein the horizontal and vertical synchronization signals are derived from the composite video signal. The synchronization signals are applied to horizontal deflection generator 22 and vertical deflection generator 23. The horizontal and vertical deflection generators may provide current for deflection coils 24 as shown or may provide scanning voltages for an electrostatic deflection system. A clamper circuit 25 is also connected to the grid 20 of the tube 19 to intermittently return the grid to a fixed potential so that the black level will remain constant.

The intercarrier sound signal is transmitted over a coaxial line 30 to the sound system which includes an instantaneous neutralized clipper, a discriminator and an audio amplifier. The clipper includes tube 31 having two triode sections and a tapped coil 32 including portions 27, 28 and 29. The intercarrier sound signal is applied through a small coupling condenser 33 across the portion 28 of the coil 32. A movable powdered iron core may be provided in the coil 32 for varying the inductance of the portion 28 for tuning without changing the close coupling between the various portions. The stepped up signal across the coil 32 is applied between the cathode 34 and grid 35 of the first triode section of tube 31. The plate 36 of the tube is connected to plus B through resistor 37 and is by-passed by condenser 38.

To provide instantaneous top and bottom level clipping, a neutralizing condenser 39 is provided between the coil 32 and the cathode 34. This condenser neutralizes the cathode-grid capacity of the first section of tube 31 so that the tube does not under-swing. When using a double triode as illustrated, a tube should be selected in which the capacity between the grid 35 and the elements of the second triode section is low, such as tube types 12AU7 or 6J6. The first triode section functions as a cathode follower and is cathode coupled to the second section which functions as a grounded grid amplifier in a well known manner. The operation of the two triodes is illustrated in Fig. 3 in which curve *a* represents the input signal applied to the grid 35 and *b* represents the voltage appearing across cathode resistor 41. The first triode section clips the negative portions of the applied wave as shown in curve *b*. It has been observed, however, that the tube will under-swing if the grid-cathode capacity is not neutralized. This action is shown by the dotted line in curve *b*. By providing the neutralizing condenser 39 and adjusting the value so that balance is obtained with the neutralizing portion 29 of the coil 32, this under-swing can be completely eliminated as shown by the solid line in curve *b*. The second triode section of the tube is effective to clip the positive portions of the wave so that the output wave is limited both at the top and bottom as shown in curve *c*. In curve *c* the action of the clipper if not neutralized, is also indicated by the dotted line.

The sound signal which has been instantaneously clipped in the tube 31 is applied from the plate 52 to the discriminator. The plate 52 is connected through discriminator coil 53 and resistor 54 to plus B potential. Condensers 55 are for radio frequency by-pass. The signal is inductively applied from coil 53 to discriminator coils 47 and 48 which are connected respectively to the plates 56 and 57 of a pair of diode rectifiers which have a common cathode 58. The cathode 58 is connected through coupling condenser 59 to the plate 52 of the second triode section of the tube 31. The variable condenser 60 tunes the discriminator to the desired intercarrier center frequency. For obtaining the audio signals the diodes are connected in opposing relation with respect to resistor 61 which functions as the volume control. Resistor 62 and condenser 63 form a de-emphasis network. The audio signal is applied from the movable tap on resistor 61 through coupling condenser 64 to the grid 65 of the triode amplifier included in tube 66 along with the discriminator diodes.

For providing a direct current unblocking voltage when an intercarrier signal is received, resistors 67 and 68 are connected to the discriminator diodes in series aiding relation for direct current resulting in a relatively large positive direct current unblocking voltage across the resistor 68. This voltage is applied through limiting resistor 69 to the grid 65 of the triode section. The cathode 70 of the triode section is biased by a positive voltage from the voltage divider including resistors 71 and 72 so that the triode is normally cut off. The voltage across resistor 68 when a carrier is received is effective to overcome this bias to cause the triode to conduct. The resistor 69 is of such magnitude (8 megohms) that the voltage from the resistor 68, when applied to the grid 65, is not sufficient to cause much grid current in the triode. Hence, a small negative bias of a few tenths of a volt is always established when the triode is unblocked, regardless of the amplitude of the unblocking bias across resistor 68.

The sound signal from resistor 61 is amplified in the triode section and appears on plate 73. The plate 73 is connected to plus B through resistor 74 and the signal path continues through condenser 75 to the grid of output amplifier 76. The output amplifier 76 may be of conventional construction with the grid being biased by resistor 78 which is bypassed by condenser 77, for de-emphasis. The cathode is biased by resistor 79. The screen grid of the tube 76 is connected to plus B through resistor 80 and the plate is connected to positive potential through the primary winding of the output transformer 81. Loud-speaker 82 is connected to the output transformer 81. The condenser 83 provides negative feedback to the cathode of tube 76 to reduce distortion at high amplitudes.

It is to be noted that the gain of the triode section of tube 66 and the output tube 76 is fixed and this gain may be quite high (of the order of 100 to 1). Therefore, to provide a given output volume, the voltage applied from resistor 61 to grid 65 will be substantially a fixed value. As the audio gain is quite high, a very small voltage at the grid 65 is sufficient so that the triode audio amplifier will provide undistorted output when operating at the small negative bias as described. As the triode will be biased off when no carrier is received due to the positive cathode potential, noise received, as when switching between stations will not be reproduced in the audio system. This squelching action is facilitated since the signal from which the sound is derived is held at a fixed value by the instantaneous radio frequency clipper.

In Fig. 2 there is illustrated a plurality of curves which will be helpful in an understanding of the operation of the gain control system which operates from the intercarrier sound wave. In this figure curve A illustrates a standard television signal including the picture frequencies represented by the portion 90 and sound frequency represented by the spike 91. The sound signal has an amplitude of the order of three-fourths that of the maximum picture signal. Curve B illustrates the band pass of a suitable intermediate frequency amplifier. The curve illustrates a symmetrical intermediate frequency response as required when the oscillator frequency is on one side of the signal frequency for one frequency band, and on the other side for the other band. The gain control system of the invention is not limited to this receiver system and can be used when the intermediate frequency response is not symmetrical. In curve B, point 92 represents the video carrier frequency, which is approximately 6 decibels below the maximum level, and point 93 represents the center frequency of the sound signals which is attenuated by about 26 decibels, or ten times down from the video carrier response. It will, therefore, be apparent that the intermediate frequency output at the sound carrier frequency will be at a much lower level than the intermediate frequency output for all video components. Therefore, the intercarrier amplitude is largely determined by the sound carrier amplitude which is indicated by the ordinate of the point 93. It will also be apparent that as the relative position of the signal with respect to the band of the amplifier is shifted, the sound intercarrier will vary due to the amplification characteristics of the intermediate frequency amplifier in the vicinity of the sound and picture carrier waves. Accordingly, the amplitude of the intercarrier signal will vary in response to changes in tuning as shown in curve C. It is to be noted that as the tuning is shifted so that the gain of the sound signal increases, the gain of the picture signal is reduced. Since the intercarrier signal varies with both the sound and picture signals, the intercarrier amplitude will drop off on each side of a maximum as shown in curve C. In actual operation only the right-hand side of the curve is generally usable because there is no intercarrier at frequencies corresponding to the left side of the curve. This is true only when the intermediate frequency band pass is sufficiently selective and the picture carrier is lost when the tuning shifts to the left. It is to be pointed out that the amplitude of the intercarrier signal also depends upon the received signal strengths of the sound and picture signals and, therefore, the amplitude of curve C for all tuning positions will change with the signal strength.

Experience has shown that the tuning can be shifted, by shifting the frequency of the local oscillator, by ±500 kilocycles or more without affecting the picture or sound quality. This fact is utilized in this system to obtain automatic gain control action. The intercarrier amplitude and gain control voltage derived therefrom changes substantially through such a frequency shift. The amount of shift possible, of course, depends upon the intermediate frequency response characteristics. Fig. 2 B shows the response characteristics of an intermediate frequency amplifier of the degenerative type having a skirt width of approximately one megacycle on each side of the 6 decibel voltage points.

The clipper in addition to limiting the intercarrier signal and providing a signal of substantially constant amplitude also produces a direct current control voltage, the amplitude of which varies in accordance with the amplitude of the intercarrier signal. This control voltage is derived from terminal 40 of coil 32 and the potential is developed across the portion 29 due to grid current drawn by grid 35 when intercarrier signals are applied thereto. This voltage is applied across resistor 42 and condenser 43 which have a short time constant of the order of 100 microseconds. The control voltage is applied through a filter comprising resistor 44 and condenser 45, which has a cut-off below the audio band (20 cycles per second), to radio frequency amplifier 11 and intermediate frequency amplifier 14 for controlling the gain thereof.

The gain control voltage which appears at point 40 in Fig. 1 is represented by curve D of Fig. 2. This control voltage is actually the peak-amplitude of the intercarrier signal minus the cathode bias of the clipper tube 31. This bias, which is about 1 volt across resistor 41, serves to delay the automatic gain control voltage so that the receiver is allowed to reach maximum gain for very weak signals. In order to control the gain of the receiver, this control voltage may then be applied to one or more amplifier stages such as the radio frequency or intermediate frequency amplifier. As illustrated in Fig. 2, operation will normally be at point 93 on curve D and point 94, curve E. When, however, the signal strength decreases, the amplitude of the intercarrier signal will decrease and the control voltage will correspondingly become less negative. This will cause the gain of the receiver to automatically increase and tend to hold the picture and sound signals at a fixed level. Also when the tuning of the receiver is changed so that the relative position of the audio signal with respect to the band pass of the amplifier is shifted slightly, (points 93 and 94 are shifted, for instance, to the right), the intercarrier amplitude will again decrease causing a change in the control voltage. This will result in a change in amplification which produces a change in the level of the picture signal and a corresponding change in the contrast of the picture. It is possible to provide for a shift of tuning of 1/2 megacycle to thereby provide sufficient variation for adequate contrast control.

The slight shifts in tuning which provide contrast control are thus superimposed functionally on the automatic gain control action. The automatic gain control action in effect changes the amplitude scale of the curve D in accordance with variations in signal strength. The automatic gain control action thus functions for any tuning position as long as the signal strength is sufficient to provide a negative bias. The contrast control is then superimposed on the automatic gain control action by shifting of the operating point (94) by fine tuning. These changes in intercarrier strength will not, however, change the amplitude of the audio signal as the instantaneous clipper holds the amplitude of the signal applied to the discriminator constant at all times.

The contrast control thus produced by change of tuning is particularly effective when used in conjunction with black level control which holds the black in the picture at the same intensity under all conditions. The clamper circuit 25 in Fig. 1 may be any such black level control. However, I prefer to use a clamper circuit such as disclosed in my copending application Serial No. 774,503, filed September 17, 1947, subject "Black-Level Control for a Television System" because this circuit is fast and is capable of following rapid tuning operations without delay. In order to provide contrast control by tuning as herein described, a continuous tuner or a tuner having a vernier which permits variations in tuning through a limited range at each station setting must be provided. Any tuner meeting these requirements will operate satisfactorily. The tuner disclosed and claimed in my application Serial No. 38,081, filed July 10, 1948, subject "Television Tuner," is particularly advantageous as it provides station selection and contrast control for all channels by operation of a single dial.

It is seen from the above that the gain control system described is effective to compensate for changes in the signal level of the received signals. The system is also effective by changing the tuning to chage the amplification of the picture signals and thereby change the contrast of the reproduced image. The gain control produced by this system is, therefore, effective both as an automatic gain control and as manual contrast control. The manual contrast control is provided by the main tuning control and, therefore, the provision of a separate contrast control on the receiver is not required.

The sound system of the receiver provides the same volume on all stations because of the instantaneous clipper which produces a square wave of predetermined peak-to-peak amplitude under all conditions. The system includes squelch action so that no sound is received when there is no intercarrier and only noise is present. This, therefore, eliminates the noise normally reproduced during tuning.

While there has been described one embodiment of my invention which is illustrative thereof, it is obvious that various changes and modifications can be made therein without departing from the intended scope of the invention as defined in the appended claims.

I claim:

1. In a television receiver for operation from a video modulated carrier wave of a first frequency and an associated audio modulated carrier wave of a second frequency having a predetermined relation to said first frequency, tuning means for selecting a video modulated carrier wave and the associated audio modulated wave, means for reducing the frequency of said modulated waves, a variable gain amplifier having a band wide enough to receive said waves of reduced frequency, means for further reducing the frequency of said audio modulated wave to produce a low frequency audio modulated wave having a frequency equal to the difference between said first and second frequencies and having an amplitude varying directly with the amplitude of said video and audio modulated carrier waves, means for producing a control voltage varying in accordance with the amplitude of said low frequency audio modulated wave and for limiting the amplitude of said wave, and means for applying said control voltage to said amplifier for controlling the gain thereof inversely with the amplitude of said low frequency audio modulated wave.

2. In a television receiver for operation from a video modulated carrier wave of a first frequency and an associated audio modulated carrier wave of a second frequency having a predetermined relation to said first frequency, a variable gain amplifier having a band wide enough to receive said waves, means for heterodyning said waves to produce an intercarrier audio wave having an amplitude varying in the same sense with variations in the amplitude of said video and audio modulated carrier waves, means for producing a control voltage varying in accordance with the amplitude of said intercarrier wave, and means for applying said control voltage to said amplifier for controlling the gain thereof.

3. In a television receiver for operation from a video modulated carrier wave of a first frequency and an associated audio modulated carrier wave of a second frequency, variable tuning means for selecting a particular video modulated carrier wave and the associated audio modulated wave, a variable gain amplifier for amplifying said video and audio modulated waves having a band pass with a dropping characteristic, means for heterodyning said audio modulated wave and said video modulated wave to produce an intercarrier audio wave having a frequency equal to the difference between said first and second frequencies, said tuning means being effective to change the position of said audio modulated wave with respect to said band pass of said amplifier to vary the amplitude of said audio modulated wave and to thereby vary the amplitude of said intercarrier audio wave, means for producing a control voltage varying in accordance with the amplitude of said intercarrier audio wave, and means for applying said control voltage to said amplifier for controlling the gain thereof.

4. In a television receiver for operation from a video modulated carrier wave of a first frequency and an associated audio modulated carrier wave of a second frequency, variable tuning means for selecting a particular video modulated carrier wave and the associated audio modulated wave, a receiver circuit having a band pass sufficiently wide to accept both said video and audio waves with the gain of said circuit falling off in the vicinity of said audio wave, means for heterodyning said audio modulated wave and said video modulated wave to produce an intercarrier audio wave having a frequency equal to the difference between said first and second frequencies, said tuning means being effective to change the position of said audio modulated wave with respect to said band pass of said circuit to vary the amplitude of said audio modulated wave and to thereby vary the amplitude of said intercarrier audio wave, means for producing a control voltage varying in accordance with the amplitude of said intercarrier audio wave, and means for applying said control voltage to said receiver for controlling the gain thereof.

5. In a television receiver for operation from a video modulated carrier wave of a first frequency and an associated audio modulated carrier wave of a second frequency having a predetermined relation to said first frequency, and in which said waves are heterodyned to provide an intercarrier audio wave having an amplitude varying in the same sense as the amplitude of said carrier waves, means for producing a control voltage varying in accordance with the amplitude of said intercarrier wave, and means for applying said control voltage to said receiver for controlling the gain thereof.

6. In a television receiver for operation from a video modulated carrier wave of a first frequency and an associated audio modulated carrier wave of a second frequency having a predetermined relation to said first frequency, and in which said carrier waves are heterodyned to provide an intercarrier audio wave having an amplitude varying in the same sense as said carrier waves, means for producing a control voltage for controlling the amplification of the video and audio modulated carrier waves which varies in accordance with the amplitude of said intercarrier wave and for producing a limited intercarrier wave the amplitude of which is substantially constant, means for applying said control voltage to said receiver for controlling the gain thereof, and means for deriving audio signals from said limited intercarrier wave.

7. A receiver in accordance with claim 6 in which said first-named means includes a neutralized clipper which is effective to limit both the positive and negative peaks of the voltage wave applied thereto.

8. A receiver in accordance with claim 6 in which said first-named means includes a tapped inductor to which said intercarrier wave is applied, an electron discharge valve having input electrodes, and a condenser, said input electrodes of said valve, said condenser and said inductor being connected in a bridge circuit, said condenser being of such value to neutralize the input capacity of said valve so that both the positive and negative peaks of said intercarrier wave are instantaneously clipped, said valve being biased to conduct when said intercarrier wave applied thereto reaches a predetermined amplitude so that the grid current flowing through said inductor provides a voltage which varies with the amplitude of said carrier wave.

9. In a television receiver for operation from a video modulated carrier wave of a first frequency and an associated audio modulated carrier wave of a second frequency spaced a fixed interval from said first frequency, variable tuning means for selecting a particular video modulated carrier wave and the associated audio modulated wave, a variable gain amplifier for amplifying said video and audio modulated waves having a band pass sufficiently wide to accept both waves with the gain falling off in the vicinity of said audio modulated wave said variable tuning means being effective to control the position of said video and audio modulated waves with respect to said band pass of said amplifier, means for heterodyning said audio modulated wave and said video modulated wave to produce an intercarrier audio wave the amplitude of which depends on the signal strength of said video and audio modulated waves and the relative position of said waves with respect to said band pass of said amplifier, means for producing a control voltage varying in accordance with the amplitude of said intercarrier wave, and means for applying said control voltage to said amplifier whereby the gain of said amplifier is controlled by the position of said tuning means.

10. In a television receiver adapted to reproduce an image from a video modulated carrier wave of a first frequency and to reproduce sound from an associated audio modulated carrier wave of a second frequency spaced a fixed interval from said first frequency, variable tuning means for selecting a particular video modulated carrier wave and the associated audio modulated wave, a variable gain amplifier for amplifying said video and audio modulated waves having a band pass sufficiently wide to accept both waves with the gain falling off in the vicinity of said audio modulated wave, said variable tuning means being effective to control the position of said video and audio modulated waves with respect to said band pass of said amplifier, means for heterodyning said audio modulated wave and said video modulated wave to produce an intercarrier audio wave the amplitude of which depends on the signal strength of said video and audio modulated waves and the relative position of said waves with respect to said band pass of said amplifier, means for limiting said intercarrier wave to produce a wave having substantially fixed amplitude and for producing a control voltage varying in accordance with the amount that the amplitude of said carrier wave exceeds said fixed amplitude, means for deriving audio signals from said intercarrier wave, and means for applying said control voltage to said amplifier whereby the gain of said amplifier is controlled by the position of said tuning means to control the contrast of said reproduced image.

11. In a television receiver for operation from a video modulated carrier wave of a first frequency and an associated audio frequency-modulated carrier wave of a second frequency having a predetermined relation to said first frequency, and in which said waves are heterodyned to provide a frequency-modulated intercarrier audio wave, the combination including means for limiting the amplitude of said intercarrier wave to a substantially fixed amplitude and for producing a gain control voltage which varies with the amount said amplitude of said intercarrier wave exceeds said fixed amplitude, means for applying said gain control voltage to said receiver for controlling the gain thereof, and means for deriving audio signals from said constant amplitude intercarrier wave including a discriminator adapted to produce an audio frequency signal and a second control voltage when said limited intercarrier wave is applied thereto, and an audio amplifier including an electron discharge valve biased so that it is non-conducting, said audio frequency signal and said second control voltage being applied to said valve with said second control voltage being effective to overcome said bias so that said audio frequency signal is amplified thereby.

KURT SCHLESINGER.

(References on following page)

REFERENCES CITED

The following references are of record in the file of this patent:

UNITED STATES PATENTS

| Number | Name | Date |
|---|---|---|
| 2,226,366 | Braden | Dec. 24, 1940 |
| 2,273,098 | Foster | Feb. 17, 1942 |
| 2,286,442 | Schook | June 16, 1942 |
| 2,400,073 | Cawein | May 14, 1946 |
| 2,448,908 | Parker | Feb. 17, 1948 |
| 2,480,115 | Brown | Aug. 30, 1949 |

OTHER REFERENCES

Riders Television Manual, vol. 2, "How It Works," copyright 1949. (Copy in Div. 16, Patent Office.)